(12) United States Patent
Lee et al.

(10) Patent No.: US 10,211,897 B2
(45) Date of Patent: Feb. 19, 2019

(54) METHOD FOR SELECTING ANTENNAS IN FULL-DUPLEX MIMO SYSTEM

(71) Applicant: KOREA UNIVERSITY RESEARCH AND BUSINESS FOUNDATION, Seoul (KR)

(72) Inventors: Inkyu Lee, Seoul (KR); Seokju Jang, Seoul (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 0 days.

(21) Appl. No.: 15/661,293

(22) Filed: Jul. 27, 2017

(65) Prior Publication Data
US 2018/0131422 A1    May 10, 2018

(30) Foreign Application Priority Data
Nov. 4, 2016  (KR) .................. 10-2016-0146303

(51) Int. Cl.
*H04L 5/14*    (2006.01)
*H04B 7/06*    (2006.01)
(Continued)

(52) U.S. Cl.
CPC ......... *H04B 7/0608* (2013.01); *H04B 7/0413* (2013.01); *H04B 7/0691* (2013.01);
(Continued)

(58) Field of Classification Search
USPC .................. 375/260, 295; 455/67.13, 101
See application file for complete search history.

(56) References Cited

U.S. PATENT DOCUMENTS

| 9,673,960 B2* | 6/2017 | Eltawil | H04L 5/1453 |
| 2008/0292012 A1* | 11/2008 | Kim | H04B 7/0452 |
| | | | 375/260 |

(Continued)

FOREIGN PATENT DOCUMENTS

| KR | 10-0726340 B1 | 6/2007 |
| KR | 10-2008-0028634 A | 4/2008 |
| KR | 10-1386654 B1 | 4/2014 |

OTHER PUBLICATIONS

Korean Office Action dated Feb. 13, 2018 in connection with the counterpart Korean Patent Application No. 10-2016-0146303, citing the above references.

*Primary Examiner* — Eva Y Puente
(74) *Attorney, Agent, or Firm* — Hauptman Ham, LLP (57) ABSTRACT

The present invention relates to a method for selecting transmitting and receiving antennas in a full-duplex MIMO system based on channel information. An embodiment of the present invention provides a method for selecting antennas in a full-duplex MIMO wireless communication system for communication between a first node and a second node. The method may include: calculating the number of transmitting antennas and the number of receiving antennas at a node i having an $N_i$ number of antennas such that $N_c$ has a maximum value, where $N_c$ represents the number of all possible antenna set candidates, N is a natural number of 2 or higher with $N_i$ being the sum of transmitting antennas and receiving antennas at said node i, and i is 1 or 2; and determining transmitting antennas and receiving antennas at node i in consideration of the transmission rate.

4 Claims, 6 Drawing Sheets

(51) Int. Cl.
*H04B 7/0413* (2017.01)
*H04B 7/08* (2006.01)

(52) U.S. Cl.
CPC ......... *H04B 7/0805* (2013.01); *H04B 7/0874* (2013.01); *H04L 5/14* (2013.01)

(56) References Cited

U.S. PATENT DOCUMENTS

| | | | |
|---|---|---|---|
| 2011/0028106 A1* | 2/2011 | Lee | H04B 7/061 |
| | | | 455/101 |
| 2011/0117859 A1* | 5/2011 | Tanaka | H04W 28/22 |
| | | | 455/67.13 |
| 2017/0237522 A1* | 8/2017 | Sudo | H04L 1/0026 |
| | | | 370/329 |

* cited by examiner

METHOD FOR SELECTING ANTENNAS IN FULL-DUPLEX MIMO SYSTEM

CROSS-REFERENCE TO RELATED APPLICATIONS

This application claims the benefit of Korean Patent Application No. 10-2016-0146303, filed with the Korean Intellectual Property Office on Nov. 4, 2016, the disclosure of which is incorporated herein by reference in its entirety.

BACKGROUND

1. Technical Field

The present invention relates to a full-duplex wireless communication system that allows simultaneous bi-directional transmission and reception, more particularly to a method for selecting transmitting and receiving antennas in a full-duplex MIMO system based on channel information.

2. Description of the Related Art

Full-duplex communication technology involves performing transmissions and receptions simultaneously at a node and theoretically can improve the capacity of a system twofold compared to existing half-duplex communication technology, which uses time resources or frequency resources divided in an orthogonal manner.

However, this property of both transmission and reception occurring simultaneously within the node may result in strong self-interference. In this context, various methods aimed at improving the performance of full-duplex communication by eliminating self-interference have been proposed and implemented in software and hardware form. One such example can be found in Korean Registered Patent No. 10-1386654.

In a conventional half-duplex communication system, the transmitting and receiving groups are fixed, since only transmission is possible for an antenna of the transmitting end, and only reception is possible for an antenna of the receiving end.

In contrast, in a full-duplex communication system, various transmitting and receiving antenna groups are possible, since each node is capable of performing both transmission and reception.

The technique for selecting the transmitting and receiving antennas by considering all possible permutations and selecting the best group, as proposed for existing full-duplex single-antenna wireless communication systems, entails an excessively high level of complexity to be employed in a MIMO system.

As such, there is a need for research on techniques for selecting transmitting and receiving antennas in a full-duplex communication system that can improve performance while keeping complexity at a minimum.

SUMMARY OF THE INVENTION

One objective of the invention is to provide a method for selecting antennas in a full-duplex MIMO antenna with which optimal transmitting and receiving antenna groups can be selected by way of a low-complexity algorithm.

To achieve the objective above, an embodiment of the present invention provides a method for selecting antennas in a full-duplex MIMO wireless communication system for communication between a first node and a second node. The method may include: calculating the number of transmitting antennas and the number of receiving antennas at a node i having an $N_i$ number of antennas such that $N_c$ has a maximum value, where $N_c$ represents the number of all possible antenna set candidates, N is a natural number of 2 or higher with $N_i$ being the sum of transmitting antennas and receiving antennas at said node i, and i is 1 or 2; and determining transmitting antennas and receiving antennas at node i in consideration of the transmission rate.

A method for selecting antennas in a full-duplex MIMO system according to an embodiment of the invention can increase the efficiency of wireless communication by forming transmitting and receiving antenna groups based on channel information.

According to an embodiment of the invention, optimal transmitting and receiving antenna groups can be selected in a full-duplex communication system with a low level of complexity.

Additional aspects and advantages of the present invention will be set forth in part in the description which follows, and in part will be obvious from the description, or may be learned by practice of the invention.

BRIEF DESCRIPTION OF THE DRAWINGS

FIG. 3 A illustrates Step1 for selecting transmitting and receiving antenna sets in a full-duplex MIMO system associated with an embodiment of the invention.

FIG. 3 B illustrates Step2 for selecting transmitting and receiving antenna sets in a full-duplex MIMO system associated with an embodiment of the invention.

FIG. 3 C illustrates Step3 for selecting transmitting and receiving antenna sets in a full-duplex MIMO system associated with an embodiment of the invention.

DETAILED DESCRIPTION OF THE INVENTION

A method for selecting antennas in a full-duplex MIMO system associated with an embodiment of the present invention is described below in more detail with reference to the accompanying drawings.

In the present specification, an expression used in the singular encompasses the expression of the plural, unless it has a clearly different meaning in the context. In the present specification, terms such as "comprising" or "including," etc., should not be interpreted as meaning that all of the elements or steps are necessarily included. That is, some of the elements or steps may not be included, while other additional elements or steps may be further included.

Figure 1:
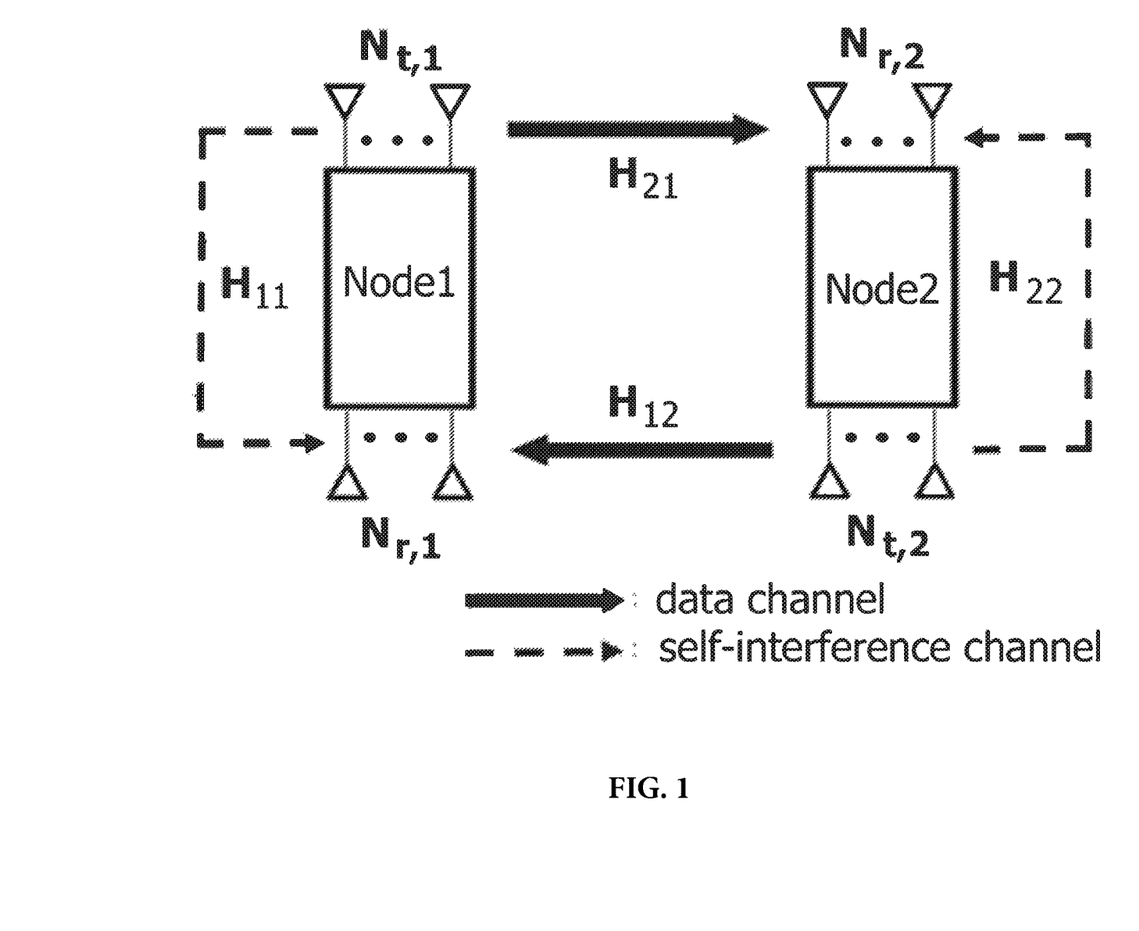
FIG. 1 is a flow diagram illustrating a full-duplex MIMO system associated with an embodiment of the invention.

FIG. 1 is a flow diagram illustrating a full-duplex MIMO system associated with an embodiment of the invention. The example set forth below considers a full-duplex MIMO system. In a full-duplex MIMO system, two nodes, referred to herein as a first node (or Node 1) and a second node (or Node 2), can transmit and receive signals simultaneously on the same frequency.

In a half-duplex communication system, the transmitting end and receiving end are fixed for each node, with only transmission possible for the antennas of the transmitting end and only reception possible for the antennas of the receiving end.

In contrast, in a full-duplex communication system, an antenna at each node is capable of both transmission and reception and can select from and perform a transmission or a reception function according to circumstances.

In the embodiment of the present invention disclosed below, a technique is described of forming transmitting and receiving antenna groups using the properties of the full-duplex communication system, where the antennas are selected according to channel information, unlike existing full-duplex communication systems, to improve the transmission rate.

$N_i$ refers to the total number of antennas at node i, $N_{t,i}$ refers to the number of transmitting antennas at node i, and $N_{r,i}$ refers to the number of receiving antennas at node i.

$N_i$ can be expressed as Equation 1 below.

$$N_{t,i} + N_{r,i} = N_i \qquad \text{[Equation 1]}$$

The reception signal $y_i$ of a node i having a transmitting and receiving antenna group S in a full-duplex MIMO communication system can be expressed as Equation 2 below.

$$y_i(S) = \sqrt{P_i} H_{ii}(S) x_i(S) + \sqrt{P_{\bar{i}}} H_{i\bar{i}}(S) x_{\bar{i}}(S) + n_i(S) \qquad \text{[Equation 2]}$$

Here, $P_i$ is the transmission power of node i, $x_i(S)$ and $n_i(S)$ are the transmission signal vector and Gaussian noise vector, respectively, of node i having a transmitting and receiving antenna group S, and $$E\{x_i(S) x_i(S)^H\} = \frac{1}{N_{t,i}} I,$$

$E\{n_i(S) n_i(S)^H\} = \sigma_n^2 I$. $H_{i\bar{i}}(S)$ is the channel from node $\bar{i}$ having a transmitting and receiving antenna group S to node i, $H_{ii}(S)$ is an autoregressive channel of node i having a transmitting and receiving antenna group S, and $\bar{1}=2, \bar{2}=1$.

Here, the transmission rate $R_i(S)$ of node i having a transmitting and receiving antenna group S can be written as Equation 3 below.

$$R_i(S) = \log_2 |I + \gamma_{\bar{i}} H_{i\bar{i}}(S) H_{i\bar{i}}(S)^H (\sigma_n^2 I + \gamma_i H_{ii}(S) H_{ii}(S)^H)^{-1}| \qquad \text{[Equation 3]}$$

Here, $$\gamma_i = \frac{P_i}{N_{t,i}}.$$

As can be observed in the equation above, channels $H_{ii}$ and $H_{i\bar{i}}$ may change according to the group S, which in turn may change the transmission rate.

Acquiring the average transmission rate according to a method of selecting optimal antennas in a full-duplex communication system can be expressed as Equation 4 shown below.

$$\bar{R}_{opt} = E\left[\max_{j=1,\ldots,N_c} R(S_j)\right] \qquad \text{[Equation 4]}$$

Here, $S_j$ is the j-th antenna set from among all possible antenna set candidates, and $N_c$ is the number of all possible antenna set candidates.

Also, $R(S_j)$ can be expressed as Equation 5.

$$R(S_j) = R_1(S_j) + R_2(S_j) \qquad \text{[Equation 5]}$$

Since Equation 4 is overly complex, a simplified approximation can be expressed as Equation 6.

$$\bar{R}_{opt} \approx \log_2 N_c + \bar{R}_{conv} \qquad \text{[Equation 6]}$$

Here, $\bar{R}_{conv}$ is the average transmission rate in a conventional full-duplex system that does not employ an antenna selection technique. Also, $N_c$ can be expressed as Equation 7 shown below.

$$N_c = \binom{N_{t,1} + N_{r,1}}{N_{t,1}} \binom{N_{t,2} + N_{r,2}}{N_{t,2}} \qquad \text{[Equation 7]}$$

The number of transmitting antennas ($N_{t,i}$) and number of receiving antennas ($N_{r,i}$) that maximize $N_c$, can be expressed as Equation 8 below.

$$\{N_{t,i}^*, N_{r,i}^*\} = \begin{cases} \left\{\dfrac{N_i}{2}, \dfrac{N_i}{2}\right\}, & \text{if } N_i \text{ is even,} \\ \left\{\dfrac{N_i \pm 1}{2}, \dfrac{N_i \mp 1}{2}\right\}, & \text{if } N_i \text{ is odd.} \end{cases} \qquad \text{[Equation 8]}$$

Here, $\{N_{t,i}^*, N_{r,i}^*\}$ is the number of transmitting antennas and the number of receiving antennas at node i providing the maximum value for $N_c$ as expressed as an ordered pair. The numbers of transmitting antennas and receiving antennas calculated by Equation 8 provide a maximum value for $N_c$ and can be the optimal numbers of transmitting and receiving antennas at node i according to an embodiment of the invention.

Figure 2:
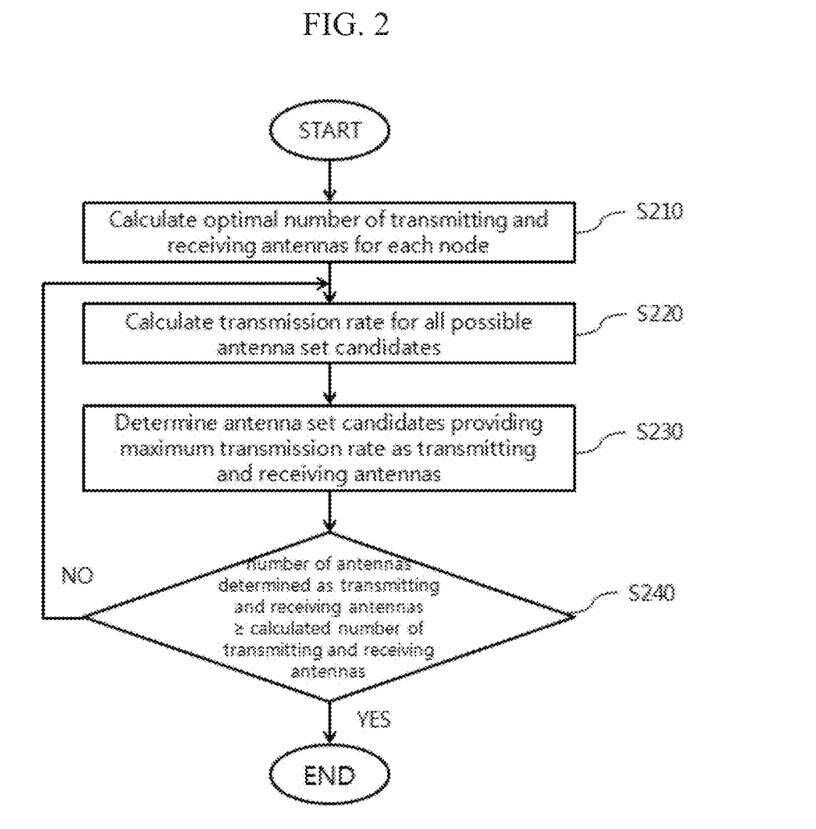
FIG. 2 is a flow diagram illustrating a method for selecting antennas in a full-duplex MIMO system associated with an embodiment of the invention.

FIG. 2 is a flow diagram illustrating a method for selecting antennas in a full-duplex MIMO system associated with an embodiment of the invention.

First, the optimal numbers of transmitting and receiving antennas can be calculated by checking the total number of antennas at each node (S210). The optimal numbers of transmitting and receiving antennas can be calculated with Equation 8 above.

Figure 3:
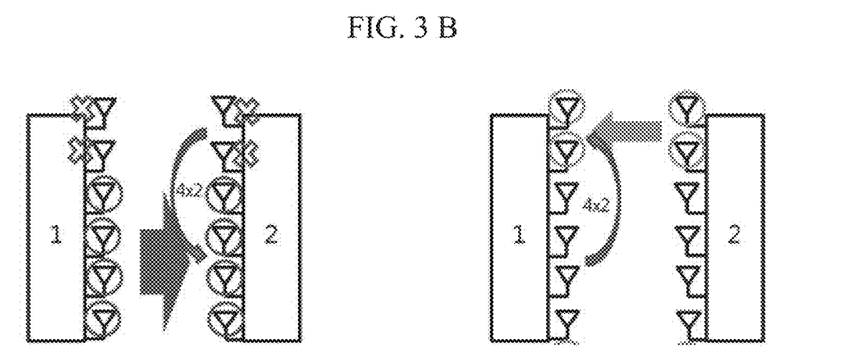
Figure 3A:
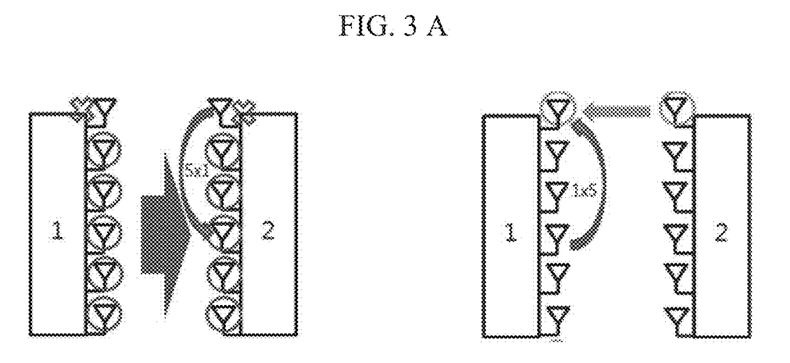
Figure 3C:
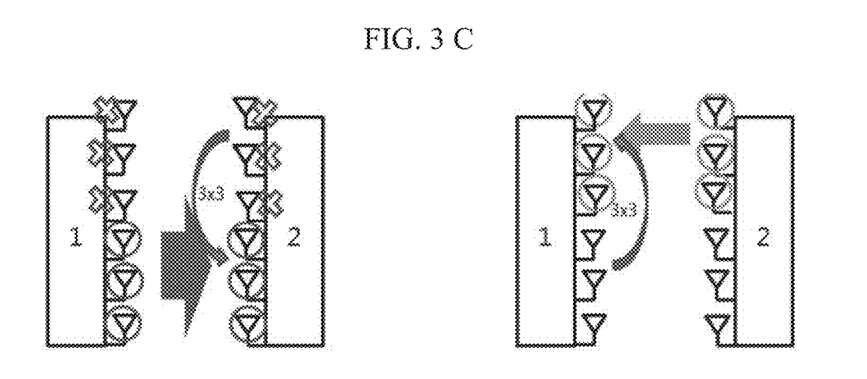

FIG. 3 A to FIG. 3C is provided to better illustrate a method for selecting transmitting and receiving antenna sets in a full-duplex MIMO system associated with an embodiment of the invention. A method of determining antenna sets is described below based on the example illustrated in FIG. 3A to FIG. 3 C.

FIG. 3 A illustrates Step1 for selecting transmitting and receiving antenna sets in a full-duplex MIMO system associated with an embodiment of the invention.

FIG. 3 B illustrates Step2 for selecting transmitting and receiving antenna sets in a full-duplex MIMO system associated with an embodiment of the invention.

FIG. 3 C illustrates Step3 for selecting transmitting and receiving antenna sets in a full-duplex MIMO system associated with an embodiment of the invention Since the total number of antennas is six at both Node 1 and Node 2, the number of transmitting antennas and the number of receiving antennas can be three at both Node 1 and Node 2.

When the optimal numbers of transmitting and receiving antennas are calculated, it is not yet determined at the initial stages whether the antennas at Node 1 and Node 2 are to be used as transmitting antennas or receiving antennas.

In the first step (FIG. 3 A), the transmission rates can be calculated for all possible antenna set candidates with one of the undetermined antennas (six in total), which have not yet been determined to be transmitting antennas or receiving antennas, supposed as a receiving antenna and the remaining undetermined antennas (five antennas) supposed as transmitting antennas at Node 1 and with one of the undetermined antennas (six in total), which have not yet been determined to transmitting antennas or receiving antennas, supposed as a transmitting antenna and the remaining undetermined antennas (five antennas) supposed as receiving antennas at Node 2 (operation S220). In this example, the total number of possible antenna set candidates is 36 (=6×6).

From among the above 36 cases, the antenna set candidates that provide a maximum value for the transmission rate can be determined as the transmitting and receiving antennas of the nodes (operation S230). For example, in the first step of FIG. 3, the one antenna of Node 1 as a receiving antenna and the one antenna of Node 2 as a transmitting antenna that provide the maximum value for the transmission rate from among the 36 cases can be determined as a set.

If the number of antennas of which the roles have been determined as transmitting or receiving antennas is smaller than the calculated optimal number of antennas, then operations S220 and S230 can be repeated.

For example, since the number of transmitting and receiving antennas determined from performing the first step in FIG. 3 is now one (and is smaller than three, the calculated number of transmitting and receiving antennas), a second step may be performed.

In the second step (FIG. 3 B), the antennas of which the roles have already been determined as transmitting or receiving antennas can be excluded, and the role of a transmitting antenna or a receiving antenna can be determined for one of the as yet undetermined five antennas at each node.

In the second step, the transmission rates can be calculated for all possible antenna set candidates with one of the undetermined antennas (five in total), which have not yet been determined to be transmitting antennas or receiving antennas, supposed as a receiving antenna and the remaining undetermined antennas (four antennas) supposed as transmitting antennas at Node 1 and with one of the undetermined antennas (five in total), which have not yet been determined to transmitting antennas or receiving antennas, supposed as a transmitting antenna and the remaining undetermined antennas (four antennas) supposed as receiving antennas at Node 2 (operation S220). At this point in this example, the total number of possible antenna set candidates is 25 (=5×5). Here, the transmission rates may be calculated with the antennas of which the roles have been determined already counted as transmitting antennas or receiving antennas as determined in previous steps.

From among the above 25 cases, the antenna set candidates that provide a maximum value for the transmission rate can be determined as the transmitting and receiving antennas of the nodes (operation S230). For example, in the second step of FIG. 3, the one antenna of Node 1 as a receiving antenna and the one antenna of Node 2 as a transmitting antenna that provide the maximum value for the transmission rate from among the 25 cases can be determined as a set.

Up to the second step, a total of two antennas have had their roles determined as transmitting antennas or receiving antennas at each node.

However, since the number of transmitting and receiving antennas determined from performing the second step in FIG. 3 is still two (and is smaller than three, the calculated number of transmitting and receiving antennas), a third step may be performed.

In the third step (FIG. 3 C), the transmission rates can be calculated for all possible antenna set candidates with one of the undetermined antennas (four in total), which have not yet been determined to be transmitting antennas or receiving antennas, supposed as a receiving antenna and the remaining undetermined antennas (three antennas) supposed as transmitting antennas at Node 1 and with one of the undetermined antennas (four in total), which have not yet been determined to transmitting antennas or receiving antennas, supposed as a transmitting antenna and the remaining undetermined antennas (three antennas) supposed as receiving antennas at Node 2 (operation S220). At this point in this example, the total number of possible antenna set candidates is 16 (=4×4). Here, the transmission rates may be calculated with the antennas of which the roles have been determined already counted as transmitting antennas or receiving antennas as determined in previous steps.

From among the above 16 cases, the antenna set candidates that provide a maximum value for the transmission rate can be determined as the transmitting and receiving antennas of the nodes (operation S230). For example, in the third step of FIG. 3, the one antenna of Node 1 as a receiving antenna and the one antenna of Node 2 as a transmitting antenna that provide the maximum value for the transmission rate from among the 16 cases can be determined as a set.

As a result of performing the third step in FIG. 3, the number of determined transmitting and receiving antennas is three (and is equal to three, the calculated number of transmitting and receiving antennas), and it is no longer necessary to perform operations S220 and S230 for determining antenna sets.

Although the example above illustrates a case in which the total number of antennas at each node is the same, the present invention can still apply to other cases having different numbers of antennas at the nodes.

Figure 4:
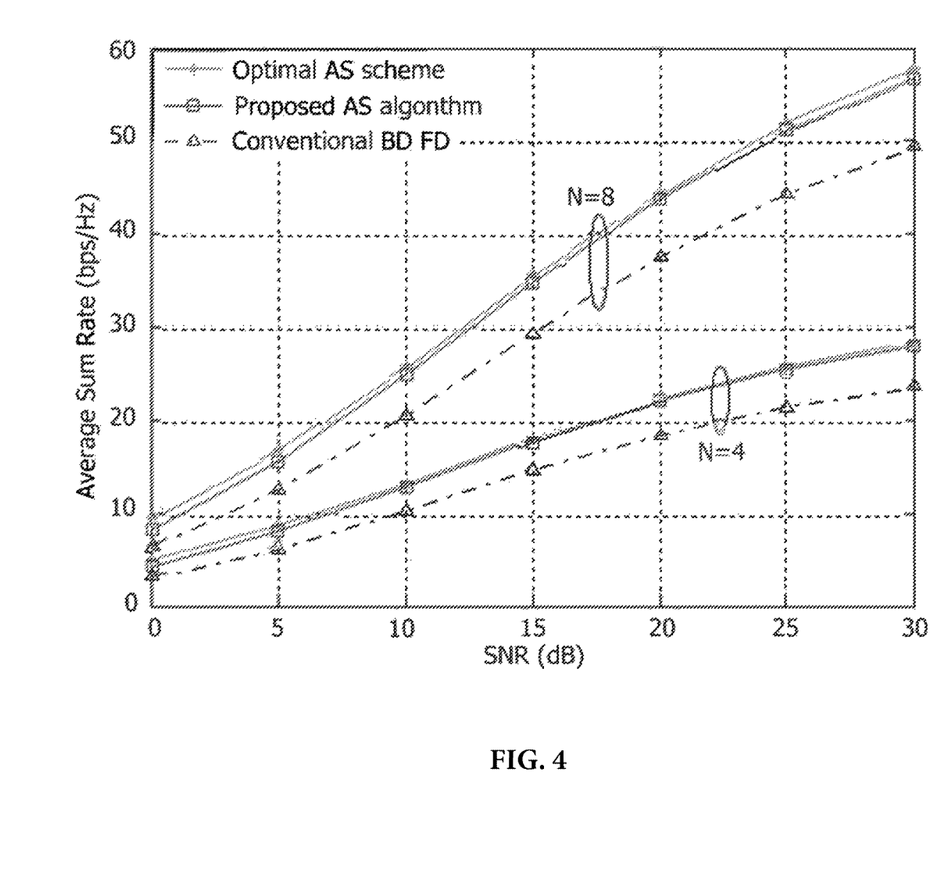
FIG. 4 is a graph comparing performance between results obtained with a method for selecting antennas in a full-duplex MIMO system associated with an embodiment of the invention and results obtained with other methods.

FIG. 4 is a graph comparing performance between results obtained with a method for selecting antennas in a full-duplex MIMO system associated with an embodiment of the invention and results obtained with other methods.

In the graph, "Optimal AS Scheme" represents the performance of the technique of selecting antennas by calculating the transmission rates for all cases (i.e. considering all antenna set candidates without considering the optimal numbers of transmitting and receiving antennas according to Equation 8), "Proposed AS algorithm" represents the performance of the technique of calculating the transmission rates only for possible antenna set candidates in consideration of the optimal numbers of transmitting and receiving antennas according to Equation 8, and "Conventional BD FD" represents the performance of a regular case in which there are no antenna selection techniques employed.

As can be observed from FIG. 4, the method of selecting antennas in a full-duplex MIMO system according to an embodiment of the invention can provide comparable performance to the "Optimal AS Scheme", which considers all cases, while significantly reducing complexity and can provide considerably higher performance compared to the regular case.

A method of selecting antennas in a full-duplex MIMO system according to an embodiment of the invention can thus increase the efficiency of wireless communication by forming transmitting and receiving antenna groups based on channel information.

According to an embodiment of the invention, the optimal groups of transmitting and receiving antennas can be selected in a full-duplex communication system with low complexity.

The selection of antennas for a full-duplex MIMO system associated with an embodiment of the present invention described above can be implemented in the form of program instructions that may be performed using various computer means and can be recorded in a computer-readable medium. Such a computer-readable medium can include program instructions, data files, data structures, etc., alone or in combination. The program instructions recorded on the medium can be designed and configured specifically for the present invention or can be a type of medium known to and used by the skilled person in the field of computer software.

Examples of a computer-readable medium may include magnetic media such as hard disks, floppy disks, magnetic tapes, etc., optical media such as CD-ROM's, DVD's, etc., magneto-optical media such as floptical disks, etc., and hardware devices such as ROM, RAM, flash memory, etc., specially designed to store and execute program instructions.

The recorded medium can also be a transmission medium such as optical or metal lines, waveguides, etc., that includes carriers transmitting signals for designating program instructions, data structures, and the like.

Also, examples of the program of instructions may include not only machine language codes produced by a compiler but also high-level language codes that can be executed by a computer through the use of an interpreter, etc. The hardware mentioned above can be made to operate as one or more software modules that perform the actions of the embodiments of the invention, and vice versa.

The selecting of antennas described above is not limited to the compositions and methods mentioned with reference to the embodiments described above. The embodiments allow for numerous variations, and parts of the various embodiments can be combined selectively.

What is claimed is:

1. A method for selecting antennas in a full-duplex multiple-input multiple-output (MIMO) wireless communication system for communication between a first node and a second node, the method performed by the full-duplex wireless communication system, the method comprising:
calculating a number of transmitting antennas and a number of receiving antennas at a node i having an $N_i$ number of antennas such that $N_c$ has a maximum value, wherein said $N_c$ represents a number of all possible antenna set candidates, said N is a natural number of 2 or higher with $N_i$ being a sum of transmitting antennas and receiving antennas at said node i, and said i is 1 or 2;
determining transmitting antennas and receiving antennas at said node i in consideration of a transmission rate;
transmitting, by the determined transmitting antennas, data; and
receiving, by the determined receiving antennas, data,
wherein the number of transmitting antennas and the number of receiving antennas at said node i such that said $N_c$ has a maximum value is expressed as Equation 1 below, $$\{N_{t,i}^*, N_{r,i}^*\} = \begin{cases} \{\frac{N_i}{2}, \frac{N_i}{2}\}, & \text{if } N_i \text{ is even,} \\ \{\frac{N_i \pm 1}{2}, \frac{N_i \mp 1}{2}\}, & \text{if } N_i \text{ is odd.} \end{cases} \quad \text{[Equation 1]}$$

where said $\{N_{t,i}^*, N_{r,i}^*\}$ is the number of transmitting antennas and the number of receiving antennas at said node i providing the maximum value for said $N_c$ as expressed as an ordered pair.

2. The method for selecting antennas in a full-duplex MIMO system according to claim 1, wherein the determining of the transmitting antennas and receiving antennas comprises:
calculating the transmission rate with any one undetermined antenna, from among undetermined antennas not yet determined as either transmitting antennas or receiving antennas, supposed as a receiving antenna and remaining antennas of the undetermined antennas supposed as transmitting antennas at node 1 and with any one of undetermined antenna, from among undetermined antennas not yet determined as either transmitting antennas or receiving antennas, supposed as a transmitting antenna and remaining antennas of the undetermined antennas supposed as receiving antennas at node 2.

3. The method for selecting antennas in a full-duplex MIMO system according to claim 2, wherein the determining of the transmitting antennas and receiving antennas further comprises:
determining a receiving antenna of said node 1 and a transmitting antenna of said node 2 providing a maximum value from among the calculated transmission rates.

4. The method for selecting antennas in a full-duplex MIMO system according to claim 3, wherein the determining of the transmitting antennas and receiving antennas is performed until a number of transmitting antennas and a number of receiving antennas determined at said node i satisfy said Equation 1.

* * * * *